Nov. 26, 1929.  J. McKINNEY  1,736,796
HEATING APPARATUS
Filed April 21, 1928   5 Sheets-Sheet 1
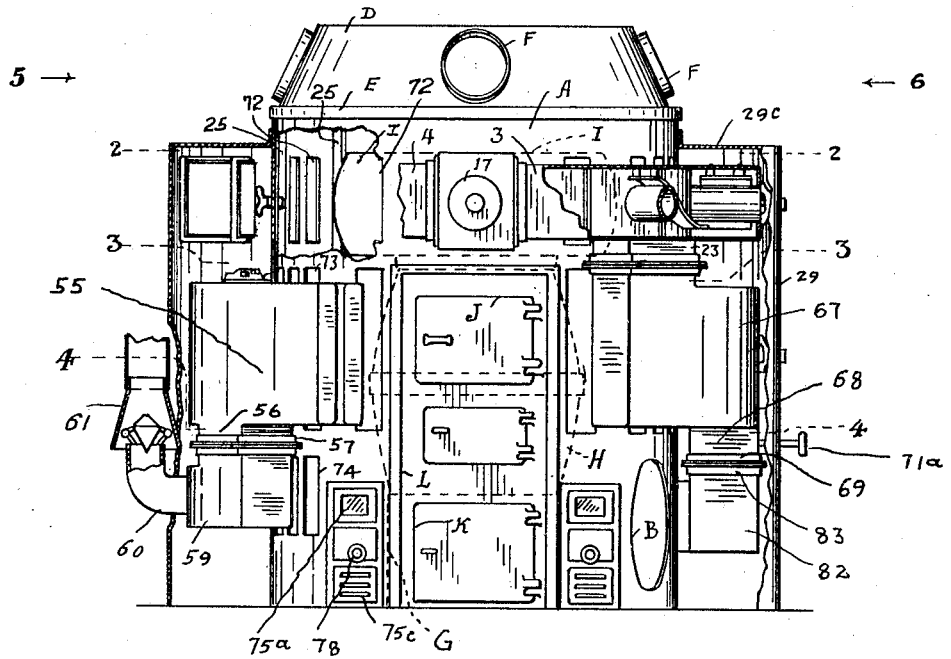
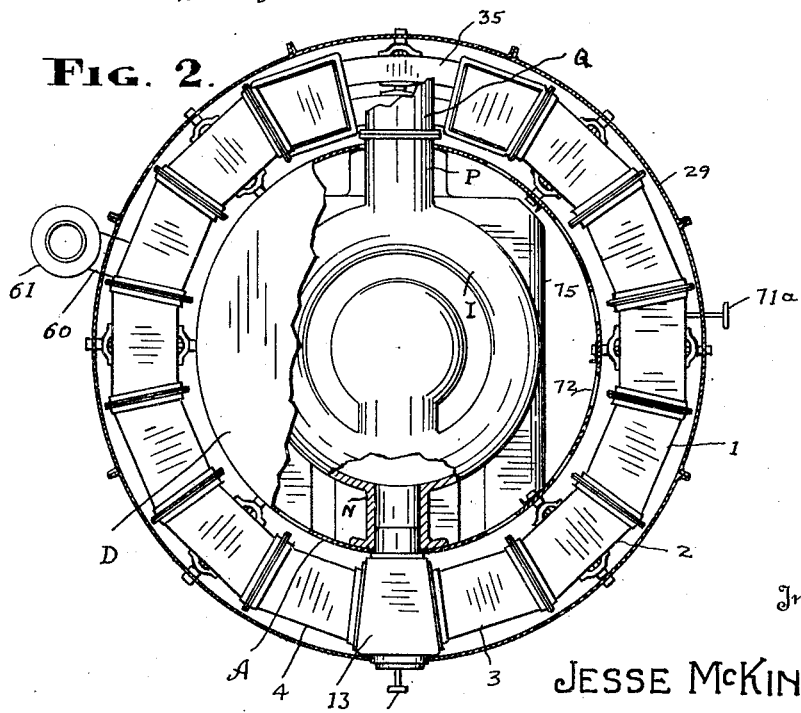
Inventor
JESSE McKINNEY.
By Thomas L Ryan
Attorney

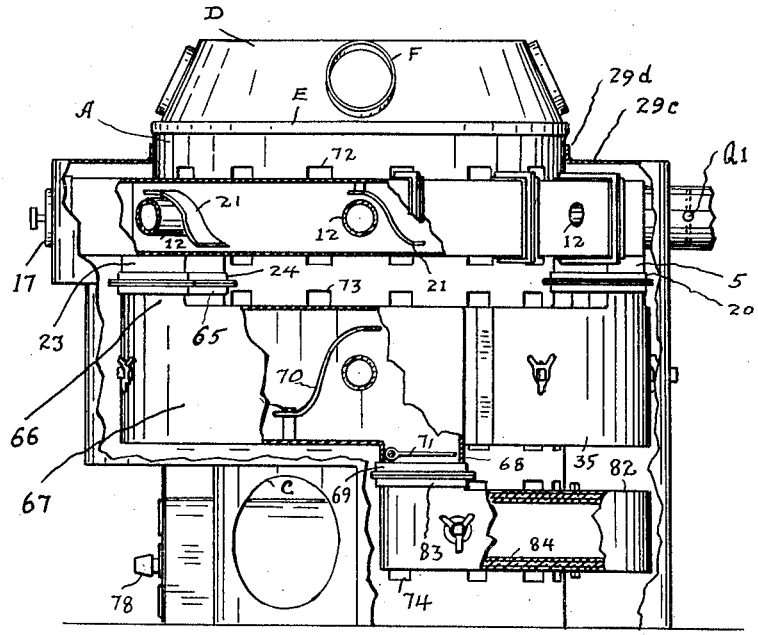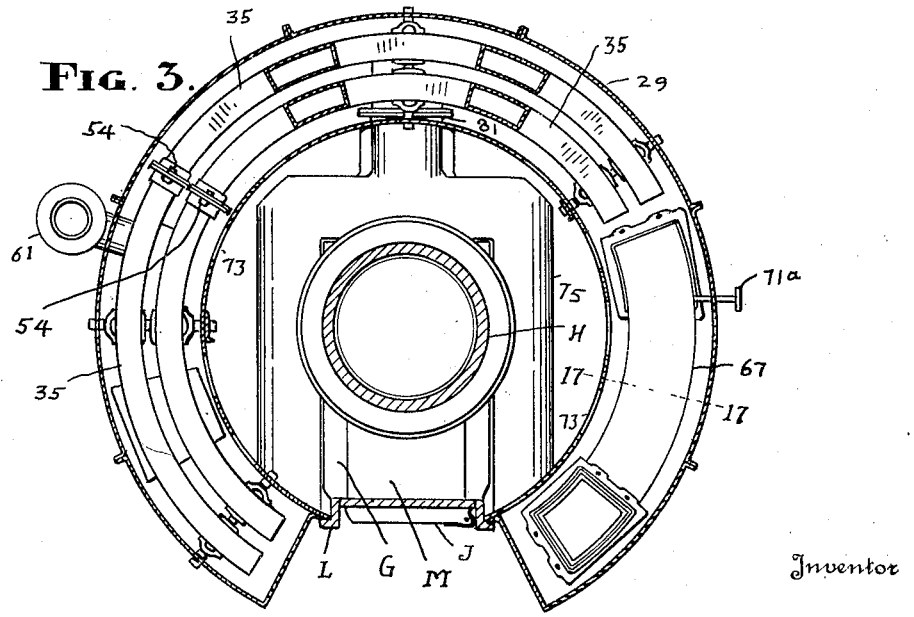

Nov. 26, 1929.　　　　J. McKINNEY　　　　1,736,796
HEATING APPARATUS
Filed April 21, 1928　　　5 Sheets-Sheet 3

Inventor
JESSE McKINNEY
By Thomas L. Ryan
Attorney

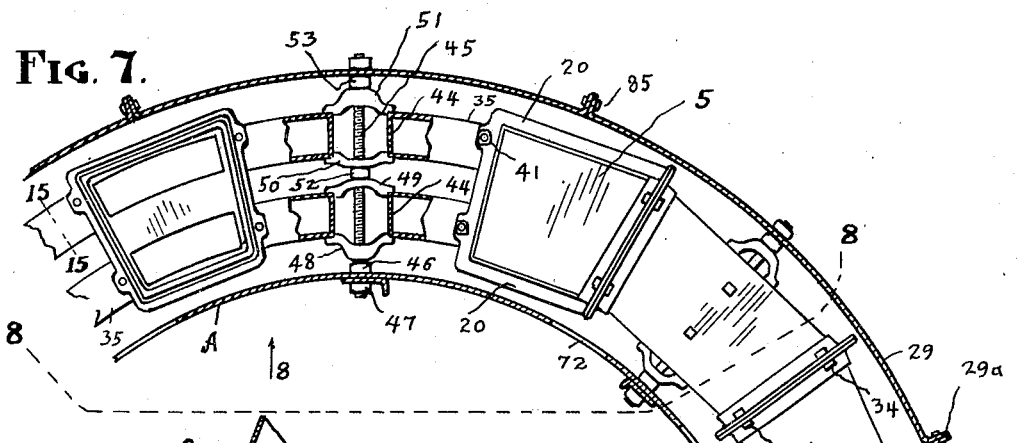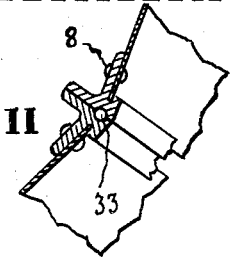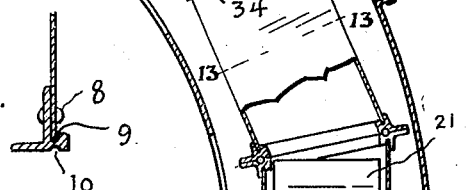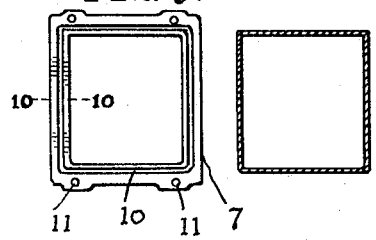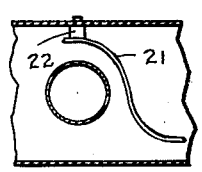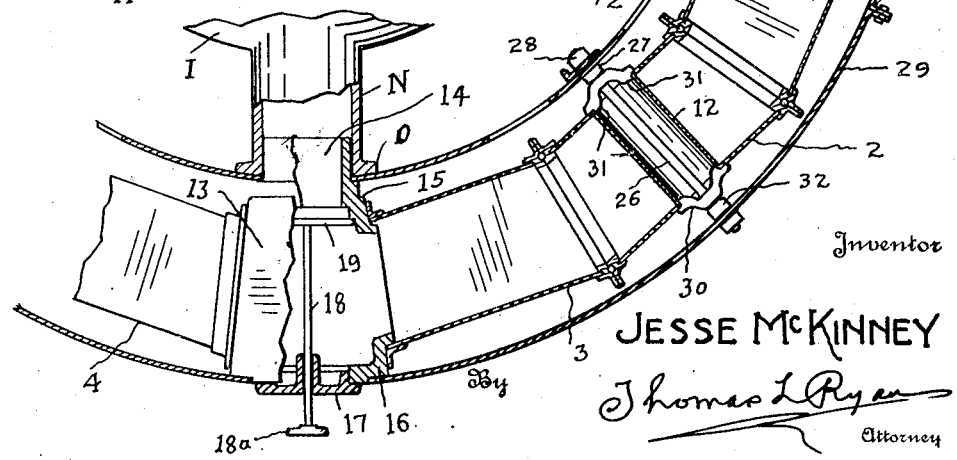

Nov. 26, 1929.    J. McKINNEY    1,736,796
HEATING APPARATUS
Filed April 21, 1928    5 Sheets-Sheet 5
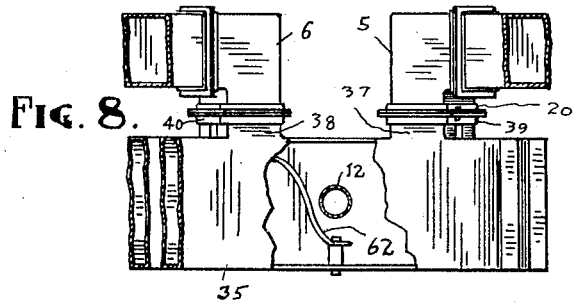
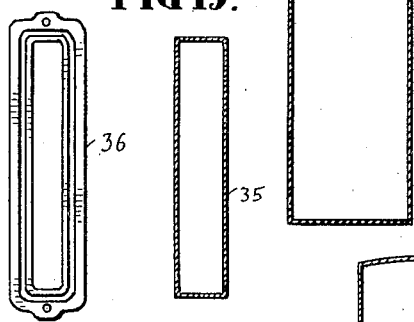
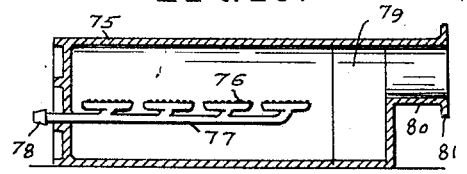
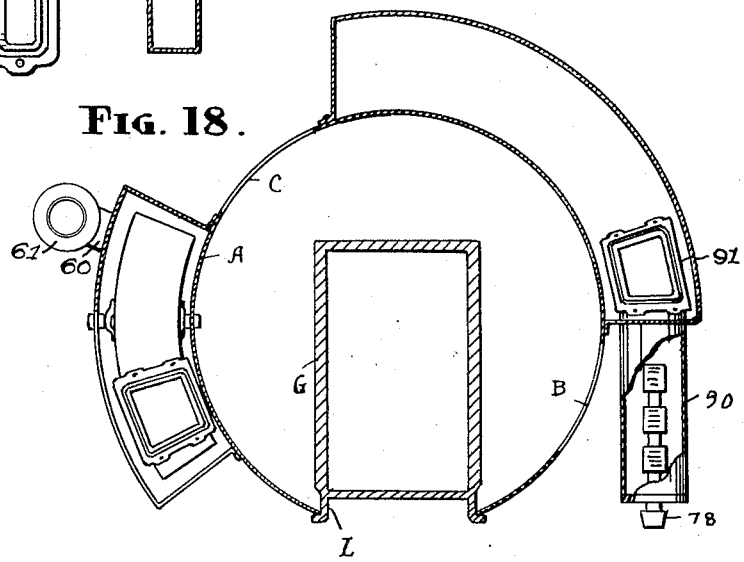
Inventor
JESSE McKINNEY
By Thomas L Ryan
Attorney Patented Nov. 26, 1929

1,736,796

UNITED STATES PATENT OFFICE

JESSE McKINNEY, OF DUNKIRK, INDIANA

HEATING APPARATUS

Application filed April 21, 1928. Serial No. 271,686.

An apparatus of the type to which the present invention has reference, consists of a heat producing unit (hereinafter referred to as a furnace) adapted for the use of coal or other manually handled fuel (hereinafter referred to as coal), a hooded sheet metal housing therefor having openings in its lower portion for intake air ducts, and there being openings in the hood portion of the housing which are provided with connections for suitable pipes that are intended for the conveyance away of the air which has become warmed within the said housing.

A disadvantage in the operating of an air-warming apparatus of the above general description is, that on account of the relatively low temperature of the metal or other material of which the housing is composed, and of the relatively low temperature of the air that surrounds the said housing, there is at all times a retardation and disturbance, in a more or less degree, of the air circulation inside the housing, the result being that the temperature of the warmed air as the same is delivered into the hood area, is uncertain and variable and the flow of the air from the hood area is correspondingly unsteady and fluctuating.

Whereas the use of additional fuel in firing, and the exercise of special effort in controlling the combustion in the furnace, may be effective in producing an increase of heat energy, the apparatus still is inefficient on account of the air becoming overheated, and of its being caused to move at a too high velocity. Moreover, there is ever present, the actual loss of the heat energy of the furnace, a part of said heat energy passing directly through the chimney, and a considerable part thereof being absorbed by the housing.

Objects of my invention are to provide means whereby there is afforded an improved circulation of the air, a conservation of the heat energy supplied, and a steady and uniformly even, and relatively large volume of properly warmed air; and to provide means whereby coal or gas may be used separately, or whereby coal, or gas, or fuel oil may be used jointly or at one and the same time in such manner that either fuel may supplement and augment the energy and effect of the other.

My invention contemplates the combination with a furnace and its housing having the usual intake openings in its lower portion, of a heat conveying and radiating flue of relatively extended length supported closely adjacent to the said housing, the said flue having communicative connection with the radiator element of the furnace, and there being port openings in the housing to permit of the passing of the air from within the housing, into and from the space surrounding the flue, a casement to enclose the space immediately about the flue and the said port openings, means to regulate the flow from the radiator element into the said flue, and a vent device extending from the flue and through the casement. The invention also contemplates the combination with the flue; of a heater device connected therewith at a point distant from the radiator element connection, and a damper device between the flue and said heater device. By such construction, combination and arrangement of parts, the heat to be imparted to the flue may be imparted thereto, either by the furnace and the heater device acting together, or separately; and without interference with the free passing upwardly of the air that enters and occupies the area within the housing.

The preferred form of embodiment for carrying my invention into effect, and as shown in the accompanying drawings, is of construction, form and arrangement especially adapted for use in connection with air-warming apparatus intended for residential heating and ventilating.

The objects of my invention are accomplished by the new construction, combination and arrangement of parts, shown in the accompanying drawings and described in the following specification. The invention is defined in the appended claims. The several parts of the invention as they appear in the different views in the drawings are identified by suitable characters of reference.

In the drawings,—

Figure 1 is a front view of my invention, portions of the casement and portions of the heat conveying and radiating flue being broken away, and disclosing to view the baffle plates in the flue, and the port openings in the housing.

Figure 2 is a top plan view of Figure 1 taken on line 2—2, the upper or top portion of the casing and a portion of the top of the housing hood being broken away, disclosing to view, in plan, the furnace structure and the upper run of the flue.

Figure 3 is a sectional top plan view taken on the line 3—3 in Figure 1, showing the lower run of the flue.

Figure 6 is a side view, as seen in the direction of arrow 6 in Figure 1.

Figure 7 is an enlarged top plan view, showing in detail, the structural formation of the upper run of the flue, and also showing the means for connecting together of the sections and parts thereof, and for retaining the same in position adjacent to the furnace housing. In this view the connecting means for the lower run flue also is shown.

Figure 8 is a side view, on a reduced scale, taken on the line 8—8 and seen in the direction of arrow 8 in Figure 7, showing the vertical connections between the lower run and upper runs of the flue, portions of the lower run of the flue being broken away disclosing to view one of the baffle plates.

Figure 9 is a front view of the flange connection frame of one of the sections of the upper run of the flue.

Figure 10 is an enlarged cross section on the line 10—10 in Figure 9.

Figure 11 is an enlarged detached cross section view of the connection of the meeting ends of the sections of the flue.

Figure 12 is a side view of a portion of one of the sections of the upper run of the flue, a portion of the wall thereof being broken away.

Figure 13 is a cross section view on the line 13—13 in Figure 7.

Figure 14 is a front view of the flange frame of one of the sections of the lower run of the flue.

Figure 15 is a cross section view taken on the line 15—15 in Figure 7.

Figure 16 is a central vertical sectional view of the heater device taken on the line 16—16 in Figure 4.

Figure 17 is a vertical cross section of section 67 of the lower run flue, taken on the line 17—17 in Figure 3.

Figure 18 is a modification, showing a heater device of form and arrangement adapted to be attached to the flue section at a position outside the furnace housing; and which is intended for use in instances wherein the heater device of the form shown in Figure 4 is not used.

Figure 5:
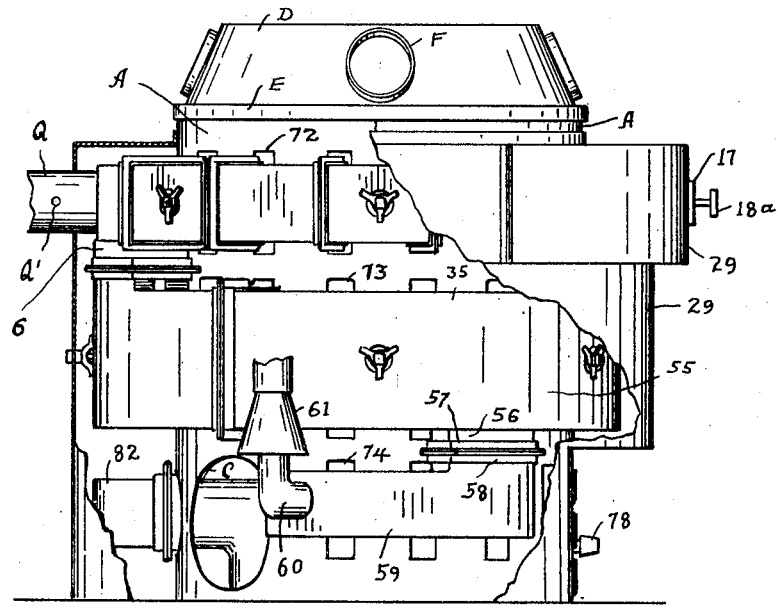
Figure 5 is a side view of my improved air-warming apparatus, as seen in the direction of the arrow 5 in Figure 1.

The housing of the furnace, consists of a cylindrical sheet metal body shell A, about fifty inches in diameter, and about fifty eight to sixty two inches in height, there being suitable openings B and C in its lower portion, and at which said openings may be attached suitable air intake ducts (not shown). The usual sheet metal hood D which is secured by a fastener ring E, has the usual openings at which flange fittings F are provided for warm air conveyor pipes (not shown).

Within the housing just described, is the furnace (indicated by the dotted lines in Figure 1), consisting of the usual ash pit frame G, upon which rests the fire pot or combustion chamber H, and the annular radiator element I. The fire door J and ash pit door K are supported by the cast metal casement L which has the usual structural union M with the furnace structure and the housing, as shown in Figure 3. Projecting from the radiator ring I is the usual clean-out neck N whose flange O is secured to the housing. At the opposite side of the said radiator ring, the usual smoke pipe stub P extends through the housing. Connected to the stub P is the smoke pipe Q, which is provided with a damper $Q^1$.

The heat conducting and radiating duct or flue which is supported closely adjacent to the exterior of the housing, consists of two portions and which may be designated as the upper run flue, and the lower run flue. The upper run consists of intermediate sections designated 1 and 2, end sections 3 and 4; and the elbow sections 5 and 6. Each of these intermediate sections is of the formation in cross section as shown in Figure 13, and is made of sheet metal of about number twenty four gauge, and the end of each of the said sections has secured thereto a metal frame like flange 7. This flange, in its horizontal portion is of the formation in cross section, as shown in Figure 10, and in its vertical portion is of the formation in cross section as shown in Figure 11. The longitudinal dimensions of these flue sections, and the bevel of the ends thereof, are such that when they are placed end to end, as shown in Figures 2 and 7, the faces of the flanges are in registration with each other. The inner legs of the said flanges are secured to the ends of the sheet metal body portions of said flue sections by rivets 8. The edges of the said sheet metal body portions are seated in channels 9 which are provided in the base portions of said inner legs. In the outer leg of each of said flanges is provided a continuously extending groove or channel 10. In the outer leg of each of the flanges spaced holes 11 are provided. The functions of said channels 10, and of the holes 11, will be presently referred to.

Each of the flue sections designated as 2, is provided with a transverse thimble 12, the function of which is to provide additional radiating surface of the flue, and which also is to provide a suitable opening through which the fastener means for retaining the flue in correct position adjacent to the housing, may be passed and secured.

A connection detail by which the end sections of the flue may be practicably united with the neck N of the radiator I of the furnace, consists of a hollow cast metal fitting 13 provided with an open cylindrical shank 14. Lateral shoulders 15 provide suitable rectangular seats for the flanges of the end sections 3 and 4 of the flue. An outer shoulder 16 provides a suitable seat for the edge portions of the casement wall. In a removable closure cap 17 whose interior shoulder is seated in a suitable bore therefor in the said fitting 13, a rod 18 is retained, and by which said rod which has the handle 18ª, a disk shaped damper device 19, may be moved to and retained in engagement with, or in position disengaged from, the mouth of the shank 14, as shown in Figure 7. By this damper arrangement, the communication between the flue and the radiator I of the furnace, may be maintained in opened or closed position; and at the same time it is capable of being entirely removed from the fitting 13, thereby permitting of access to the interior of the radiator element I for purpose of inspection or of cleaning. The elbow sections 5 and 6 which are directed downwardly, as shown in Figure 8 and in Figure 6, are each provided with flanges 20 which are similar to each other, and which are of the formation, in plan, as shown in Figure 7. The functions of these flanges 20, and their formation in cross section are the same as those of the flanges illustrated in Figures 9, 10 and 11. In each of the sections 2 of the said flue, there is retained a metal baffle plate 21, as shown in Figure 12. The preferred form of this baffle plate is the reverse curve formation as shown, and it may be secured by a fastener block 22 which may be bolted or riveted to the body portion of the flue section.

On the underside of the body section 2 which is adjacent to the end section 3 of the upper run flue, is a downwardly directed neck 23 which has the flange 24.

At a proper altitude, and at spaced locations in line with the vertical stiffener bars 25 of the furnace housing A (see Figures 1 and 7), radially disposed support bolts 26, are secured by nuts 27 and 28, as shown in Figure 7. These support bolts 26 are of length to project beyond the plane of the casement sheathing 29, and which said casement will be presently referred to. A connector detail by which the said bolt 26 may act as a support for the flue structure, and by which the latter is retained at spaced distance from the housing A and from the casement 29, consists of a seat spider 30. This seat spider, as shown in detail in Figure 7, has its body portion provided with a bore of suitable diameter to be passed onto the bolt 26, and each of the legs, which may be three in number, is provided with an integrally formed lug 31. These lugs are adapted to engage the rim edges of the thimble 12.

In installing a body section of the flue, a seat spider is disposed on the bolt 26 and at rest against the nut 27; the body section of the flue is then disposed at position with the rim edge of its thimble in engagement with the lugs 31 of the spider. A second seat spider is then disposed on the bolt and with its lugs 31 in engagement with the rim of the thimble. Nut 32 is then screwed to engagement with the seat spider.

In the channel 10 of the face of the flange of each of the body sections, is retained by suitable plastic cement, a rope of fire-test braided heat-proof packing 33. Section after section of the flue is then placed in position in the manner as above described, the rope filling the space provided by the channels and the meeting faces of the flanges being in registration, and connected together by suitable bolts 34. After the bolts 34 will have been tightened and the flue sections will have been secured together, the nuts 32 on the support bolts 26 are then screwed to secure position.

The structure and formation of the lower run flue will be understood by referring to Figure 3. This lower run flue consists of similar concentrically arranged sheet metal ducts 35 which are rectangular in cross section, as shown in Figure 15. Each of these ducts consists of body sections, the open ends of which are provided with flanges 36 which are of the formation as shown in Figure 14. These flanges are of cast metal, and are of the same formation in cross section as the flanges 7, and they perform the same functions referred to in the description heretofore, of the flanges 7 as illustrated in Figure 9. This lower run flue extends from a location opposite the fitting 13 of the upper run flue, and on a plane below same, in one direction approximately one sixth of the circumference of the housing, and in the opposite direction to a point adjacent to the door casement L, as shown in Figure 3, and in Figure 1.

The upwardly directed necks 37 and 38, are provided with flanges 39 and 40, and which said flanges are connected by bolts 41 to the flanges 20 of the elbow sections 5 and 6 of the upper run flue.

The body sections of the lower run flue are provided with transverse thimbles 44 the functions of which are to provide additional surface area for the flue, and to provide a suitable opening through which the fastener means for retaining the flue in position may be readily passed and secured. At proper locations in the housing A, all thread support bolts 45, are retained in radial position by the securing nuts 46 and 47. The seat spiders for connecting this flue in position are designated 48, 49, 50 and 51. The body portion of each of these seat spiders has a bore of suitable diameter to be passed on the bolt 45, and each of the legs is provided with a lug which is adapted to engage the rim edge of the thimble. In installing these body sections of the lower run flue, seat spider 48 is disposed on the bolt 45 and at rest against the nut 46. A body section is then disposed with the rim edge of its thimble against the lugs of the spider; spider 49 is then placed in position on the bolt 45 with its lugs in engagement with the outer rim edge of the thimble. Nut 52 is then screwed to engagement with the spider 49. Next, spider 50 is placed in position, then the outer body section; then spider 51; and then the nut 53 is tightened against the spider 51.

This procedure is followed by securing the flanges 36 together by the bolts 54, and then by a tightening of the unts 53.

Figure 4:
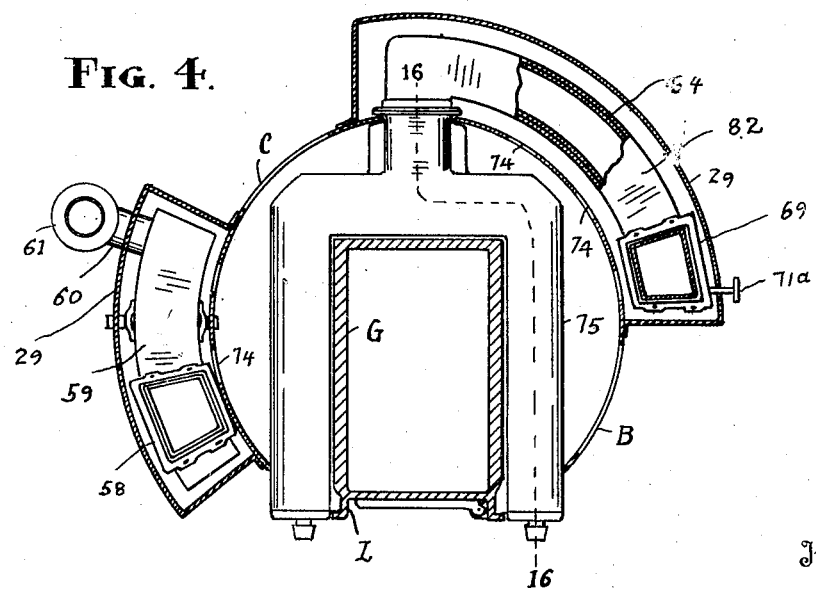
Figure 4 is a sectional top plan view taken on the line 4—4 in Figure 1, showing the heater device, the connector conduit which extends from the said heater device to the lower run of the flue, and also showing the terminal portion of the lower run of the flue, and the vent device which extends therefrom through the casement.

Directed downwardly from the terminal portion 55 of the lower run flue, as shown in Figure 1, and Figure 5, is neck 56, whose flange 57, is connected to the flange 58 of a terminal flue section 59. This terminal flue section, which is suitably supported adjacent to the housing, as shown in Figure 4, is provided with a vent pipe 60 which extends through the casement shell 29 and is directed upwardly. A draft hood 61 having the structure as shown in cross section in Figure 1 is provided on the said vent pipe and which is extendible to the chimney (not shown).

Adjacent to each of the thimbles of the lower run flue sections, is disposed a baffle plate 62 which may be of the formation and may be secured in the manner as shown in Figure 8. It will be understood that the number and location of the baffle plates in the upper run flue and in the lower run flue may be varied.

Connected to the flange 24 of the neck 23 of the upper run flue, by a flange 65 and neck 66, is the lower run flue section 67. This flue section 67 is rectangular in cross section, as shown in Figure 17, and extends in alignment concentric with the furnace housing and to a location near the opposite end of the lower run flue. The said flue section 67 has the downwardly directed neck 68 provided with flange 69. 70 designates a baffle plate provided in this flue section 67. In the neck portion 68 of this flue section, is provided a damper 71 which is operable by a handle 71ª which projects outside the casement 29. The function of this damper will be presently referred to.

At suitable heights, and throughout the area of the furnace housing A, at locations adjacent to the upper run, and to the lower run of the flue, are provided apertures or airways which permit of the free passing of the air from the interior of the housing to the area immediately adjacent to and about the flue, and thence into the housing. These openings are designated as port openings, and they are indicated by the numerals 72, 73 and 74.

Although a considerable portion of the metal constituting the housing shell may be cut away in the providing of the airway or port openings, the function of the housing as a supporting means for the several parts connected thereto, is not interfered with. The upright stiffener bars 25 not only compensate for the metal that has been cut away, but they cooperate with the body portion of the housing in constituting a support or frame structure for the parts attached thereto, comprising the hood D, the flue sections, and the casement 29.

Located inside the furnace housing A is a heater device adapted to be operated with oil or gas, and it is connected by a suitable heat conducting conduit to the flue section 67. In an embodiment of my invention in which a furnace of the structure shown in the drawings, is used, this heater device is preferably of U shaped formation in plan, as shown in Figure 4, and it is adapted to rest with its parallel body portions closely adjacent to the walls of the ash pit frame G. This heater device consists of a pair of similar cast metal housings 75, in each of which are arranged suitable burners 76. The burners rest upon the usual mixing tubes 77 which are provided with the mixers 78. The housings 75 are turned toward each other and they constitute at the joining portion, a combustion chamber 79, and neck 80. The said neck is provided with a flange 81. Extending from said neck 80 is a heat conduit 82 which is of arcuate formation to repose in alignment concentric with the furnace housing, and it is provided with a flange 83 which is adapted to be connected to a flange 69 of the flue section 67. The walls of this heat conduit 82 are of sheet metal line with a ply or plies of asbestos or other suitable insulatory or refractory material 84.

The casement 29 hereinbefore referred to, and whose function is to enclose the space about the flues and to constitute an envelope or enclosure for retaining the air which is passed through the port openings and about the flues, may consist of panels of sheet metal of twenty four gauge. The panels are arcuate in cross section, and they are provided with out-turned flanges 29ª which are secured together by suitable bolts or metal screws 85. The edge of the top portion 29ᶜ of the casement is provided with flanges 29ᵈ which are secured to the housing A by metal screws. A nut 86 screwed on the end of each of the support bolts, serves to stay the intermediate portions of the panels of casing.

A heater device of the formation shown in Figure 16 of the drawings, is suitable for use where the furnace structure and housing constitute a part of the complete and original installation of an air warming apparatus. It is conveniently located and is easily accessible.

For installation of the invention in connection with a furnace and its housing which has already been in use; a heater device of the modified form, as shown in the plan view in Figure 18, is provided. This modified device, is intended to be used instead of the U shaped heater device 75 and the heat conduit 82. It comprises a housing 90 and is equipped with burners, tubes and mixer, and with frontal frame having its structure similar to that shown in Figure 16. A suitable flange 91 is adapted to be connected to the flange 69 of the flue 67.

It will be understood that modifications may be made and practiced in the structural formation, and in the details of the heat conveying and air warming flue, and in the means for fastening them together and in connection with the furnace housing; and that these parts may be made in form and structure to constitute an attachment device for furnace equipment already in use.

The preferred material for the several flue sections is copper-bearing, corrosion and rust resisting sheet metal about twenty two, twenty four and twenty six gauge, the material of the heavier gauge being used in those portions of the flue nearest to the combustion areas.

In the practice of my invention, fuel of any kind, such as coal, wood, oil or gas may be used in the furnace. The apparatus may be operated by the use solely of the furnace, or by the use solely of the gas burning heater device, or it may be operated by the use of both the furnace and the heater device.

In every instance where the gas burning heater device having combustion chamber 79, or the modified form of heater device 90 is used, the damper 71 is open, and in every instance where the gas burning heater device is not used, the damper 71 is closed.

In instances where gas (or oil fuel) is used in the furnace, the damper Q¹ is closed and the damper 18—19 is open. The heat from the furnace passing from the radiator element I through the neck N and into the upper run of the flue causes the flue soon to become heated. The high temperature heat content entering the said flue is carried by the natural draught on its long and relatively slow travel, the same being continuously and advantageously retarded by the baffle plates, yet flowing almost as freely as if entirely unobstructed, through the upper and lower runs of the flue, and into the terminal section and thence to the vent pipe. The effect of this heating process is to constitute the flue throughout its extent an efficient heat radiator. The thimble openings afford an increased radiating area, and they also function to accelerate the movement of warmed air from the area near the casement 29 toward the warm air spaces within the housing. The various runs of the flue and the spaced parallel ducts of the lower run of the flue afford a relatively large radiating area. This heating of the flue as described, sets up a circulation of air within the casement and throughout the warm air circulating spaces within the housing. The warmed air rises and flows through the openings 72 and 73 and the cooler air from within and around the lower circumference of the housing flows through the openings 74 and the lower portions of openings 73. The warmed air circulates freely through the transverse thimble openings and around and over the various runs of the flue, the same being progressively heated more intensively as it nears the hood area of the housing; with the result that a relatively large supply of warmed air, ample in volume for the average cool weather of spring and fall and for moderate winter weather, flows continuously and uniformly toward and through the distributor pipes.

In instances where bituminous coal is to be used in the furnace and gas (or oil fuel) is to be used in the gas burning heater device, the damper Q¹ is open and the damper 18—19 is closed. Heat supplied from the combustion chamber 79 (or 90) causes the air content of the intake flue section 67 to be quickly heated, and the heat flows freely into the upper run of the flue, which flue then functions throughout its extent in the same manner as is described in the preceding paragraph. In such instances where gas (or fuel oil) is used in the gas burning heater device the flow of warmed air toward and through the distributor pipes is readily ample for the average cool weather of spring and fall and for moderate winter weather. In instances where gas (or fuel oil) is used in the gas burning heater device, as above set forth, and during seasons when a still greater volume of warmed air is required, the heat derived from the gas burning heater device may be efficiently augmented, at any time, by firing with coal in the furnace; and the two heat producing units will function simultaneously, each supplementing and augmenting the other and the two working together efficiently and in perfect harmony. In such instances in case of an emergency shortage of gas and in seasons when a highly increased volume of warmed air may be required, the maximum capacity of the coal burning furnace may be readily attained, because the chill of the housing has been eliminated, and because the warm air spaces within the housing and its dome and the warm air distributor pipes are already in process of functioning, and because the heat energy from the coal burning furnace is efficiently augmented by the reserve heat energy from the gas burning heater device. The efficiency of the coal burning furnace is therefore greatly increased for the reasons as above set forth, and because the chilling effects of sudden and several lowering of the temperature about the housing has been practically entirely overcome by the heating of the flues as hereinbefore described. In the functioning of my invention, the housing of the furnace, and its hood, and the warm air distributer pipes leading therefrom, are pre-heated to a certain extent. This pre-heating contributes somewhat to the minimizing of any loss of heat energy caused by sudden lowering of outside temperature, and to the uninterrupted functioning of the several parts, and whereby the heating apparatus is quickly responsive and is capable of being speedily accelerated to a highly increased volume or to maximum capacity. In instances wherein the fuel consists either of anthracite coal, or of coke, the damper $Q^1$ is open, and the damper 18—19 is closed, while the fire is being started. When the fire will have developed to a live glow, the damper 18—19 is opened and the damper $Q^1$ is closed.

Whereas my invention is shown as embodied in form especially applicable to air-warming apparatus for residential use, I wish it to be understood that the invention is capable of being embodied in form for apparatus for the heating of interiors of buildings or spaces of most any character where heating is desired. Features of the invention are the combination with the casement or enclosure about the furnace or heater unit, of a warming flue element so constructed and arranged with reference to said casement and the housing of the heater unit, that a minimum portion of the radiating energy of the heating unit is affected by outside temperature conditions. In other words, the area of heat absorbing surfaces is minimized. Another broad feature of the invention is that the heat conducting and radiating flue may function, either solely from the energy of the combustion chamber or radiator of the furnace; or solely from the energy of the gas heater, or jointly from the energy supplied by both the furnace and the heater device.

Another outstanding and advantageous feature of the invention is, that the heating apparatus constructed and equipped in accordance therewith, may be efficiently operated either with coal separately, or with gas (or fuel oil) separately, or with both coal and gas (or fuel oil) at one and the same time. The changes from either fuel to the other; and from either fuel to both fuels; and from both fuels to a single fuel of either kind, may be readily made without the removal or the interchange of grates, burners, or other parts.

I am aware that minor changes and modifications may be made in the details of construction, and in the formation and structure of the several parts of the invention, without departing from the spirit of the invention or sacrificing any of its advantages.

What I claim as my invention, and desire to secure by Letters Patent, is:—

1. An apparatus of the kind described, comprising a furnace and radiator, a housing therefor having air intake openings, a heat conveying and radiating flue supported outside of said housing and having communicative connection with the radiator of the furnace, there being port openings in the housing, a casement to enclose the space about the flue and the said port openings, and means to control the flow of the heated gases from the radiator into the said flue.

2. An apparatus of the kind described, comprising a furnace and radiator, a housing therefor having air intake openings, a heat conveying and radiating flue supported closely adjacent to and outside of the upper portion of the housing and which extends downwardly and thence in a reverse direction and closely adjacent to the exterior of the housing, the upper portion of the said flue being in communicative connection with the radiator of the furnace, and the said housing being of open work structure in the portions thereof between the planes of the tops and bottoms of the upper and the lower portions respectively of the flue, a casement to enclose the space about the said flue and the open portion of the housing, and a damper between the radiator and the said flue.

3. An apparatus of the kind described comprising a furnace and radiator, a housing therefor, a flue of extended length supported closely adjacent to and outside of the housing and which consists of an upper and a lower portion, the end of the latter being closed, a vent provided in the lower portion and the upper portion being communicatively connected to the radiator of the furnace, and there being port openings in the said housing at locations adjacent to the upper and the lower portions of the said flue, a damper between the radiator and the said flue, and a draught hood on the said vent.

4. An apparatus of the kind described, comprising a furnace and radiator, a housing therefor having air intake openings, a flue supported closely adjacent to and outside of the housing and having communicative connection with the radiator of the furnace, there being port openings in the housing, a casement enclosing the space about the flue and the said port openings, a heater device connected with the flue, a damper between the radiator of the furnace and the said flue, and a damper between the heater device and the said flue.

5. An apparatus of the kind described, comprising a furnace and radiator, a housing therefor having air intake openings, a flue supported closely adjacent to and outside of the housing which is of extended length and is provided with a communicative connection with the radiator of the furnace, there being port openings in the housing, a casement to enclose the space about the flue and the said port openings, a heater device connected with the flue at a location distant from the radiator connection, a damper between the radiator and the said flue, a damper between the heater device and the said flue, and a vent device in the terminal portion of the flue and which is extended through the said casement.

6. In an air-warming apparatus, the combination with the furnace housing adapted for the intake of fresh air at its lower portion and provided with air-way openings in its body portion, of a flue of arcuate formation adapted to be supported at position concentric with and adjacent to the outside of said housing, a casement to enclose said flue and the air-way openings area, a heater device, and an insulatory heat conduit therefrom, and within the lower area enclosed by the casement, and which said heat conduit has communication with the said flue.

7. In air-warming apparatus, the combination with the furnace housing provided with air-way openings arranged in rows one above the other, of a heat-conveying and radiating flue of arcuate formation and supported outside of, and in concentric relation to said housing, the said flue consisting of an upper portion and a lower portion, the latter being of multiple formation and having a terminal portion provided with a discharge conduit, a vent from said discharge conduit, and a draught hood for the said vent, heat conducting connections between the furnace and the upper portion of said flue, an intake duct opening into said upper portion, and a heater device to discharge into said intake duct.

8. In air-warming apparatus, a housing for the furnace and which is provided with air-way openings in its walls, an upper flue and a lower flue adapted to be supported concentric with and adjacent to said housing, communicatory connections between the said flues, a connection between the upper flue and the heat conducting element of the furnace, an air intake duct opening into the upper flue, a vent at the terminal portion of the lower flue, and a heater device to supply heat into the said intake duct, and a casement to enclose the space about the flues and the body portion of the housing.

9. In air-warming apparatus of the kind described, a housing for the furnace comprising a lower portion provided with air intake openings and an upper portion adapted to retain the distributer hood, the intermediate or body portion of said housing being provided with air-way openings, upright frame members to brace and stay the said housing, an upper and a lower flue concentric with and adjacent to the exterior of said housing, support connections between the frame members and the said flues, communicatory connections between the flues, a connection for the upper flue adapted to communicate with the heat conducting element of the furnace, an air intake duct opening into the upper flue, a vent at the terminal portion of the lower flue, a heater device to supply heat into the intake duct, and a casement to enclose the space about the flues, and about the body portion of the said housing.

10. In air-warming apparatus of the kind described, a flue structure rectangular in cross section and having spaced thimbles therethrough, and a baffle plate of reverse curve formation adjacent to each of said thimbles.

11. In air-warming apparatus of the kind described, in combination with the furnace housing and the frame members thereof, and a flue having transverse thimbles therethrough, support bolts extended from the housing, spiders loose on the bolts and adapted to be seated in the rims of the thimbles, and means to tighten the spiders to secure engagement with the flue, and to the said housing.

12. In air-warming apparatus of the kind described, in combination with the furnace housing and the frame members thereof, a flue having transverse thimbles therethrough, and the casing which encloses said housing and flue, support bolts having their inner ends secured to the housing and frame members, their body portions being passed through said thimbles, a spider loose on said rod and between the flue and the housing, a spider loose on said rod and between the flue and the casement, means to tighten the spiders against the flue and to tighten the inner spider against the housing, and means to tighten the casement against the outer spider.

13. In air-warming apparatus of the kind described, in combination with the furnace housing, vertical stiffener members secured to the housing, support bolts extended radially from and having their inner ends secured to said housing and frame members, an inner spider loose on each of said support rods, a flue consisting of arcuate sections having their ends adapted to be secured together in sealed coengagement and having transverse thimbles whose rims are in sealed engagement with the walls of the flue, said thimbles providing increased radiating area and facilitating the placing of the flue sections in associated relation with said support rods, an outer spider for each support rod, a nut on each support rod to tighten the spiders to secure engagement with the flue section, and the inner spider to secure engagement with the housing, a casement to enclose the space about the flue and in which said casement openings are provided to engage the outer ends of the said support rods, and nuts on the ends of the support rods.

14. An air warming apparatus of the kind described, comprising a furnace and radiator and housing therefor, there being air-way openings in the said housing, and upper and lower flue having communication with each other, the said upper flue having communication with the said radiator, and which said flues are adapted to be supported in position concentric with and adjacent to the exterior of the said housing, a casement to enclose the space about said flues and the said airway openings, and which said casement together with the said housing and said flues constitute a multiple wall jacket about the furnace, a damper between the said radiator and the upper flue, a damper in the lower flue, and a vent device in the lower flue.

15. In an air warming apparatus, the combination with the furnace housing adapted for the intake of fresh air at its lower portion, and provided with airway openings in its body portion, of a flue of arcuate formation supported at position concentric with and adjacent to the exterior of said housing, a casement to enclose said flue and the air way openings area, connections carried by said flue whereby heat may be introduced thereinto, either from a heater device positioned within the said housing, or positioned outside the said housing.

16. In an apparatus of the kind described, the combination with a furnace structure and the housing therefor, a flue supported outside the housing, and a casement to enclose said flue and housing, of a heater device of U shaped formation in plan and having its complemental body portions closely adjacent to the sides of the furnace structure, and at their rear ends merging into a combustion chamber provided with neck extended through the said housing, and conduit connections between the neck of said combustion chamber and the said flue.

17. An apparatus of the kind described, comprising a furnace and radiator, a housing therefor having air intake openings, a heat conveying and radiating flue supported closely adjacent to the outside of the upper portion of the housing and which extends downwardly and thence in a reverse direction and closely adjacent to the exterior of the housing, the upper portion of the said flue being in communicative connection with the radiator of the furnace, and the said housing being of open work structure in the portions thereof between the planes of the lower extremity of the housing hood and the upper extremity of the air intake openings in the housing, a casement to enclose the space about the said flue and the open portion of the housing, and a damper between the radiator and the said flue.

JESSE McKINNEY.